(12) United States Patent
Jager

(10) Patent No.: US 8,074,791 B1
(45) Date of Patent: Dec. 13, 2011

(54) HOOK ASSEMBLY FOR A CONVEYOR BELT

(75) Inventor: Todd Jager, Sioux City, IA (US)

(73) Assignee: Industrial Design Fabrication & Installation, Inc., Sioux City, IA (US)

( * ) Notice: Subject to any disclaimer, the term of this patent is extended or adjusted under 35 U.S.C. 154(b) by 0 days.

(21) Appl. No.: 12/854,681

(22) Filed: Aug. 11, 2010

(51) Int. Cl.
*B65G 17/06* (2006.01)

(52) U.S. Cl. .................................. 198/853; 198/850

(58) Field of Classification Search ........... 198/850–853
See application file for complete search history.

(56) References Cited

U.S. PATENT DOCUMENTS

| | | | |
|---|---|---|---|
| 4,662,029 A | 5/1987 | Helsene et al. | |
| 4,832,183 A | 5/1989 | Lapeyre | |
| 5,458,051 A | 10/1995 | Alden et al. | |
| 5,544,740 A | 8/1996 | Kissee | |
| 5,597,156 A | 1/1997 | Claassen | |
| 5,601,180 A | 2/1997 | Steeber et al. | |
| 5,810,149 A | 9/1998 | Sandberg et al. | |
| 6,152,284 A | 11/2000 | Sandberg et al. | |
| 6,155,919 A | 12/2000 | Haagensen et al. | |
| 6,227,356 B1 * | 5/2001 | Van Zijderveld et al. | .... 198/850 |
| 6,390,285 B2 | 5/2002 | de Geus et al. | |
| 6,497,610 B1 | 12/2002 | Reichert | |
| 6,554,129 B2 | 4/2003 | Straight et al. | |
| 7,056,954 B2 | 6/2006 | Evans et al. | |
| 7,097,030 B2 | 8/2006 | Gundlach | |
| 7,234,589 B2 | 6/2007 | Sedlacek | |
| 7,255,227 B2 | 8/2007 | Melancon | |
| 7,364,038 B2 | 4/2008 | Damkjaer | |
| 7,445,544 B2 | 11/2008 | Niemiec | |
| 7,494,006 B2 | 2/2009 | Knott et al. | |
| 7,527,143 B2 | 5/2009 | Krisl et al. | |
| 7,628,684 B2 | 12/2009 | Jagusch | |
| 2001/0017254 A1 | 8/2001 | Geus et al. | |
| 2002/0090903 A1 | 7/2002 | Annema et al. | |
| 2004/0079621 A1 | 4/2004 | Mott | |
| 2004/0086610 A1 | 5/2004 | Allan Falk et al. | |
| 2006/0006050 A1 | 1/2006 | Sedlacek | |
| 2006/0030251 A1 | 2/2006 | Dufour et al. | |
| 2006/0081449 A1 | 4/2006 | Gundlach | |
| 2006/0108204 A1 | 5/2006 | Marsetti | |
| 2006/0219530 A1 | 10/2006 | Melancon | |

(Continued)

OTHER PUBLICATIONS

Intralox, Modular Plastic Conveyor Belting, www.intralox.com, Jul. 7, 2010.

*Primary Examiner* — James R Bidwell
(74) *Attorney, Agent, or Firm* — Lathrop & Clark LLP

(57) ABSTRACT

A hook assembly for a modular conveyor belt having a conveying surface is provided. The hook assembly has a link interleaved with a plastic link from the modular conveyor belt. A hinge pin secures the link and plastic link together. The link has a recess in the conveying surface, an aperture disposed in the recess and a slot adjacent the aperture opening into the recess. The slot has a reinforced segment. A hook having a shall is provided which is slidable in the slot and includes a sharpened end of the hook disposed on a conveying side of the link and a translational member carried by the shaft and engagable with a track on a conveyor assembly such that the interaction between the track and the translational member results in movement of the hook between a lowered position in which the hook is positioned within the recess and a raised position in which the hook is disposed above the conveying surface. A modular conveyor belt is also provided.

7 Claims, 10 Drawing Sheets

U.S. PATENT DOCUMENTS

| | | |
|---|---|---|
| 2007/0089970 A1 | 4/2007 | Damkjaer |
| 2008/0099312 A1 | 5/2008 | Lucchi |
| 2008/0176500 A1 | 7/2008 | Jagusch |
| 2008/0210528 A1* | 9/2008 | Menke et al. .................. 198/853 |
| 2009/0057108 A1 | 3/2009 | Paardekooper et al. |
| 2009/0250324 A1* | 10/2009 | Menke et al. .................. 198/853 |

* cited by examiner

HOOK ASSEMBLY FOR A CONVEYOR BELT

FIELD OF INVENTION

The present invention relates to modular belt conveyors, and in particular food product hook assemblies for use with modular belt conveyors.

BACKGROUND

It is known to use conveyor systems including conveyor belts in many industries to transport product. Conveyor belts and systems in the food industry must be cleaned continuously and effectively to keep the belts and systems sanitary. Modular plastic belts or chains are frequently used in the food industry as they are cleanable.

Unfortunately, current devices used to hold down product, such as Meat or other food product, on a conveyor belt are not suitable for use with a modular conveyor belt. Instead these conveyor belts used with hold down assemblies are often formed of metal, and in particular are often formed of multiple steel chains with stainless steel slats bolted to the chains to form a continuous belt. As a result, the belts are often difficult to clean, leading to problems maintaining a sanitary conveyor system. Furthermore, metal conveyor belts are prone to bind or jam, are heavy, and are generally cumbersome and expensive to install and use.

Accordingly, a hook assembly which is easy to install, use, and maintain in a sanitary condition with a plastic modular conveyor belt is provided.

SUMMARY OF THE INVENTION

A modular conveyor belt formed of a polymer-based material is provided. The modular conveyor belt has a plurality of plastic links interleaved and secured together by laterally disposed hinge pins forming a conveying surface. A hook assembly is also provided which has a link interleaved with a plastic link from the plurality of plastic links and secured together by a hinge pin. The link has a recess in the conveying surface, an aperture disposed in the recess and a slot adjacent the aperture opening into the recess. The slot has a reinforced segment. A hook has a shaft slidable in the slot, a sharpened end of the hook disposed on a conveying side of the link, and a translational member carried by the shaft and engagable with a track on a conveyor assembly such that the interaction between the track and the translational member results in movement of the hook between a lowered position in which the hook is positioned within the recess and a raised position in which the hook is disposed above the conveying surface.

A hook assembly for a modular conveyor belt having a conveying surface is also provided. The hook assembly has a link interleaved with a plastic link from the modular conveyor belt. A hinge pin secures the link and plastic link together. The link has a recess in the conveying surface, an aperture disposed in the recess and a slot adjacent the aperture opening into the recess. The slot has a reinforced segment. A hook having a shaft is provided which is slidable in the slot and includes a sharpened end of the hook disposed on a conveying side of the link and a translational member carried by the shaft and engagable with a track on a conveyor assembly such that the interaction between the track and the translational member results in movement of the hook between a lowered position in which the hook is positioned within the recess and a raised position in which the hook is disposed above the conveying surface.

DETAILED DESCRIPTION OF PREFERRED EMBODIMENTS

While the disclosure herein is particularly described with regard to modular conveyors used in the food industry for use in conveying meat, poultry and agricultural products, it will be understood and apparent to those of skill in the art that the present invention has other applications where sanitary conveyor belts may be important.

Figure 1:
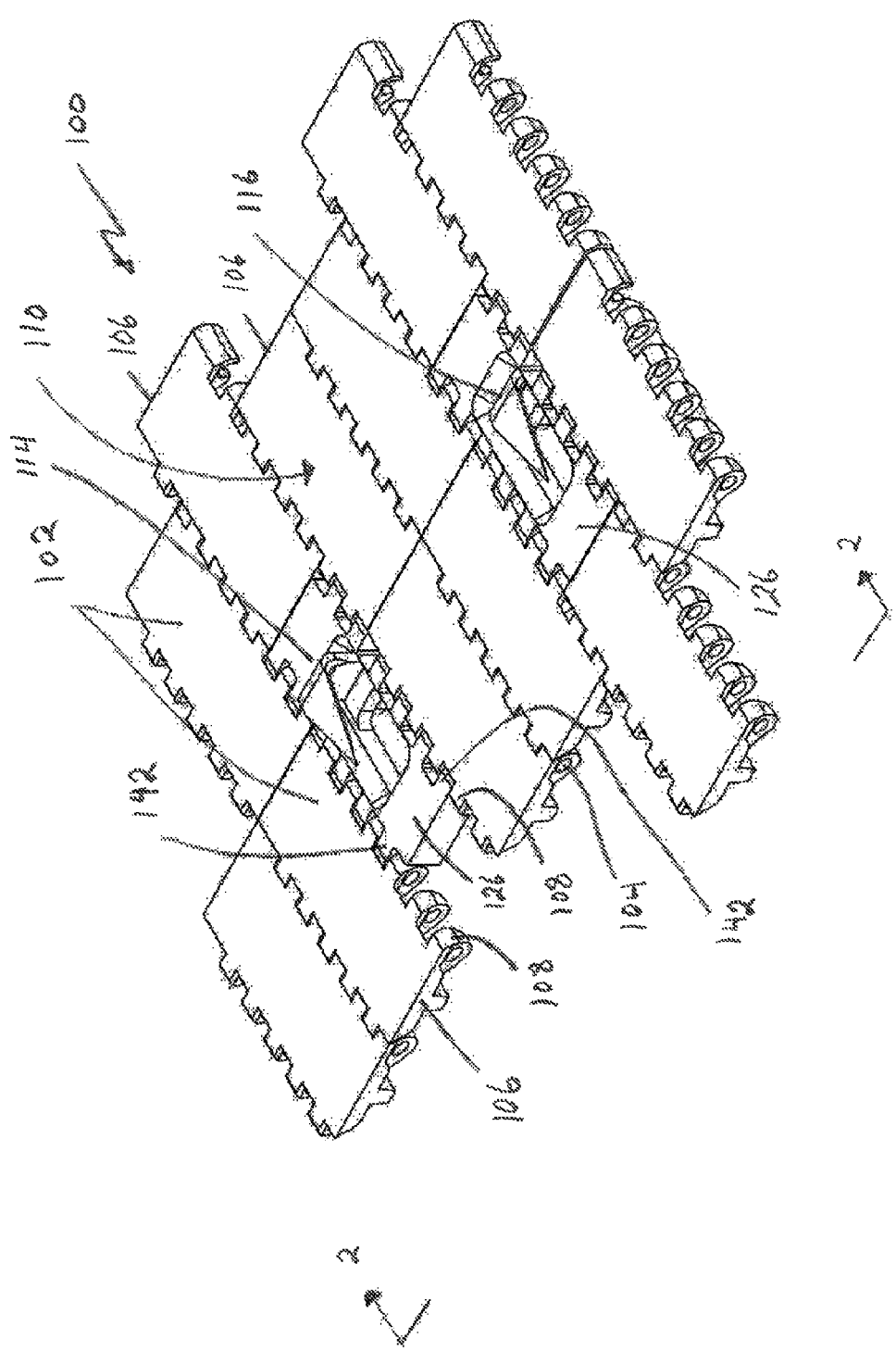
FIG. 1 is a partial perspective view of a modular conveyor belt having two hook assemblies secured thereon.
Figure 2:
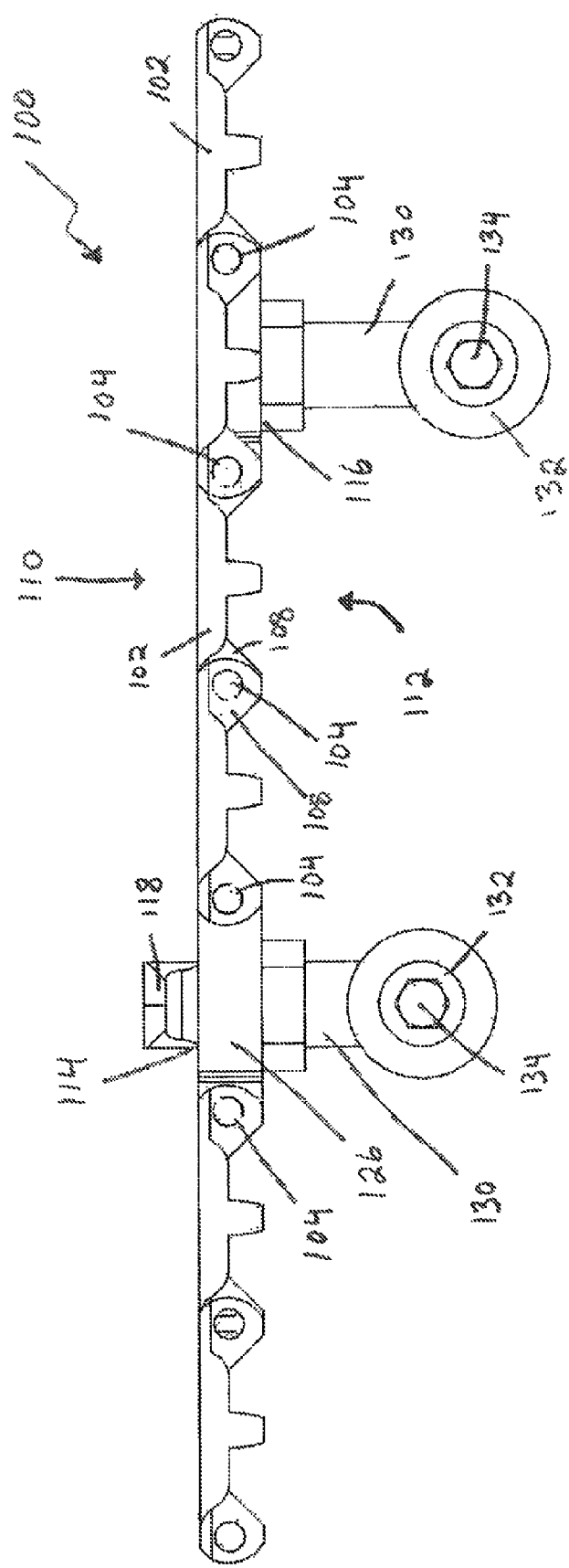
FIG. 2 is a side elevation view of the modular conveyor belt shown in FIG. 1, taken from line 2-2 of FIG. 1, showing one hook assembly in a raised position and one hook assembly in a lowered position.
Figure 3:
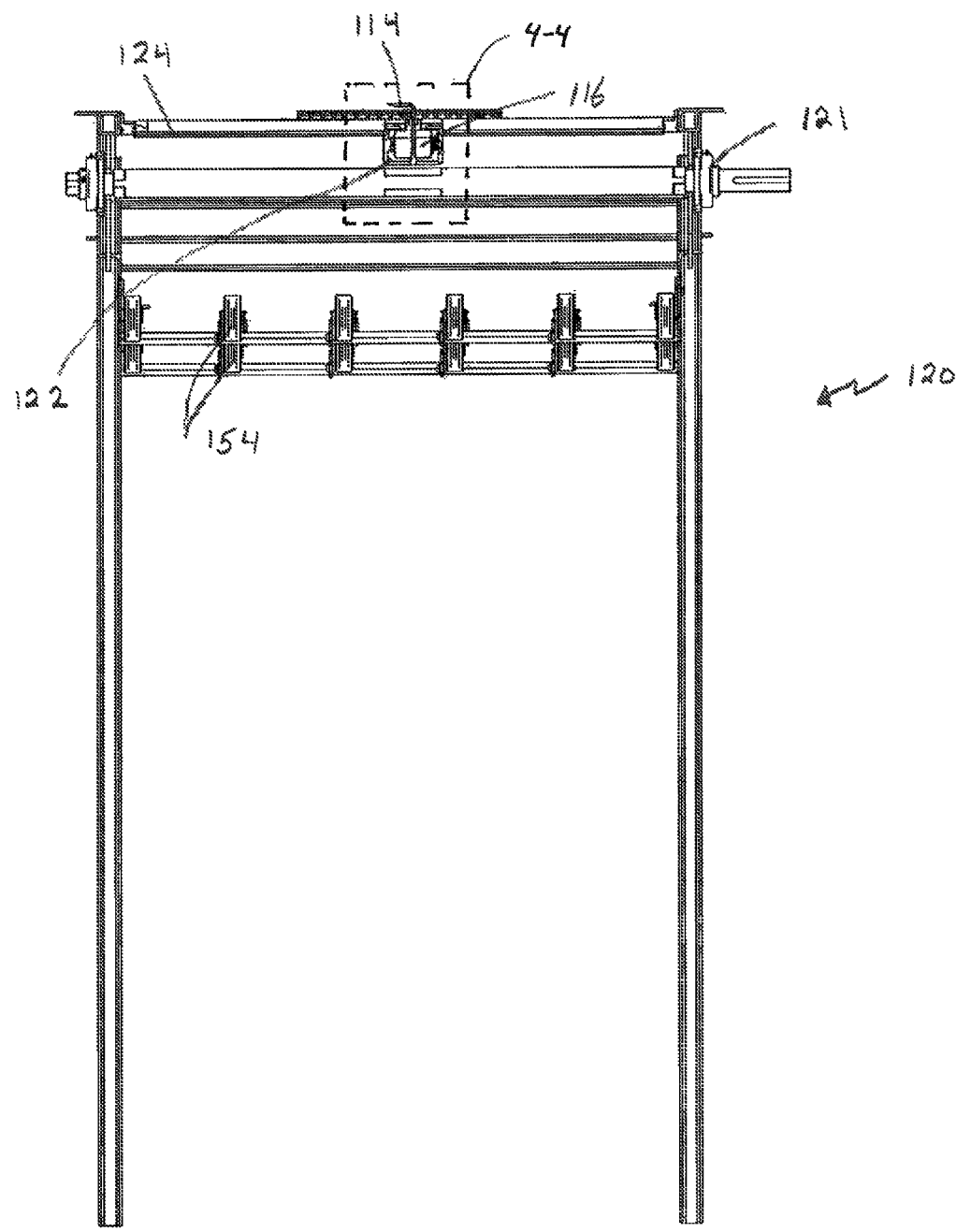
FIG. 3 is a cut-away end elevation view of one or more examples of a conveyor assembly having a portion of a modular conveyor belt shown in FIG. 1 thereon.
Figure 4:
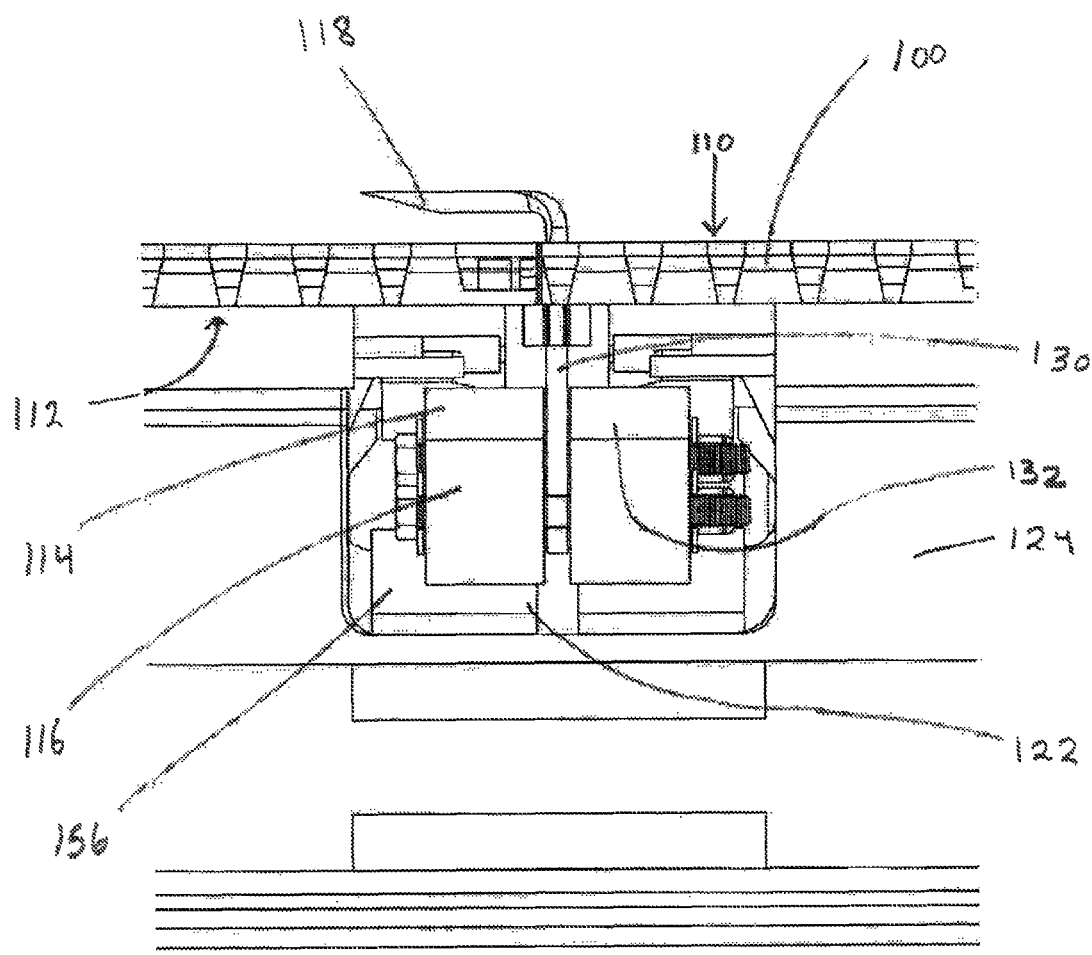
FIG. 4 is a cut-away end elevation view of the conveyor assembly shown in FIG. 3, taken from section 4-4 of FIG. 3.
Figure 5:
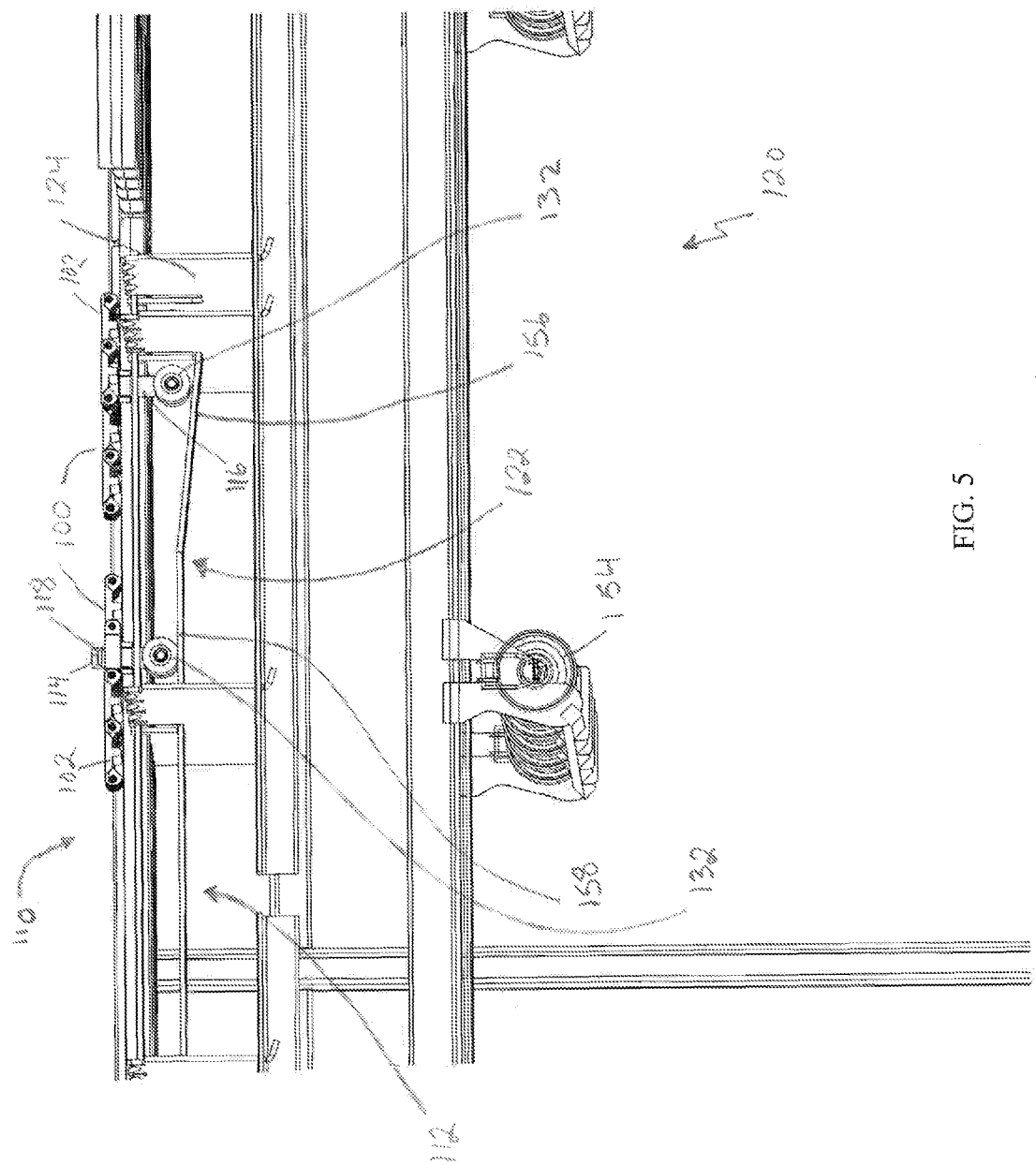
FIG. 5 is a cut-away partial side perspective view of the conveyor assembly shown in FIG. 3.
Figure 6:
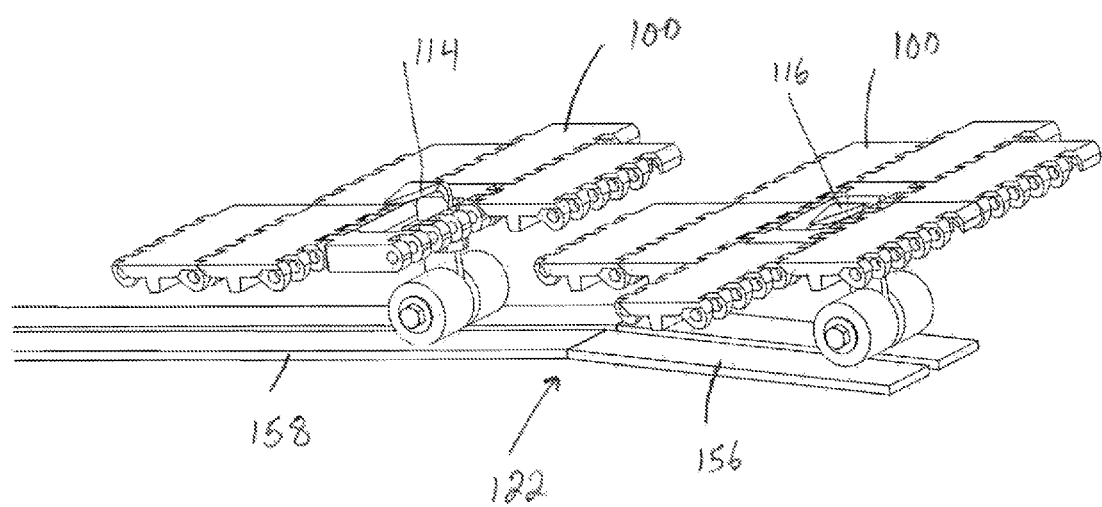
FIG. 6 is a side perspective view of the partial modular conveyor belt, two hook assemblies and track shown in FIG. 5.

Generally, the modular conveyor belt 100 is constructed of one or more rows of plastic or thermoplastic belt links 102 formed by any suitable plastic material such as but not limited to polypropylene, polyethylene, and acetal. The belt links 102 are connected together by hinge pins 104 forming joints. The modular conveyor belt 100 may be constructed of a series of rows of links 106, each row 106 having one or more links 102. When multiple links 102 are used to form a row 106, for example laid end-to-end, the modular conveyor belt 100 may be laid out in a brick lay pattern with adjacent rows of links 106, although such an arrangement is not required. FIGS. 1-2 illustrate a portion of a modular conveyor belt 100 having links 102 laid out in a brick lay pattern. Rows of links 106 are connected by hinge pins 104 inserted through interleaved or aligned receptors 108 or apertures in each link that form passageways between the rows 106. The length of the rows, the number of rows, and size of links may be varied, resulting in numerous combinations and varying sizes of conveyor belt. The connected links 102 may form an endless belt loop having an outer conveying surface 110 and an opposite inner surface 112. The outer conveying surface 110 may be a flat article-conveying surface, although any combination or number of accessories may be added to the belt 100 either integrally or detachably. Examples of accessories include, but are not limited to, side guards, flights, rollers, tabs, guides, and various inserts.

The modular conveyor belt 100 may be used on a conveyor system which articulates the belt 100 about a sprocket 121 or more than one sprocket. The conveyor system may also be power-driven by a suitable drive mechanism (not shown) driving the rotation of the sprocket which correspondingly moves the conveyor belt 100.

While specific examples are given, any suitable arrangement of a conveyor assembly or system and conveyor components may be acceptable for the purposes provided.

One or more hook assemblies may be attached to a conveyor belt 100. While a hook assembly 114 or 116 is specifically illustrated as a hold down assembly in the Figures, the invention is not so limited, as for example, the shape of the hook may be varied to pierce or otherwise penetrate product in a different manner for which the primary purpose is not to hold down product on the conveyor belt 100 without departing from the overall scope of the present invention. In the illustrated example, the modular conveyor belt 100 has a plurality of hook assemblies 114, 116 or hold down assemblies attached thereto as shown in FIGS. 1-6. Multiple hook assemblies 114, 116 may be arranged spaced apart along the belt 100 and may be oriented in the same lateral position or may vary in position. Spacing between adjacent assemblies 114, 116 may be suitable for use in attaching product, and in this regard may be spaced apart by one or more inches, or may be spaced apart by one or more feet, and in one example adjacent hook assemblies may be spaced approximately five to ten inches apart. Any suitable spacing for the operator's needs may be acceptable for the purposes provided. In the illustrated example shown in FIGS. 1 and 2, one hook assembly 114 is shown in a raised position and one hook assembly 116 is shown in the lowered position. As best seen in FIG. 2, in the raised position a hook 118 extends above the outer conveying surface 110 of the belt 100. In the lowered position, the hook 118 is recessed below the outer conveying surface 110 of the belt 100.

The modular conveyor belt 100 and hook assemblies 114, 116 may be assembled with a larger conveyor assembly 120 as shown in FIGS. 3-6. In the example provided, the hook assemblies 114, 116 are carried by the conveyor belt 100 in the approximate center of the belt 100. However, any location between the outer edges of the belt 100 is acceptable for the purposes provided. In one or more examples of embodiments, the hook assembly 114, 116 is positioned on the conveyor assembly 120 above a track 122 or rib mounted below the belt 100 and carryway supports 124. The hook assembly 114, 116 is arranged to ride on the track 122 as the belt 100 and hook assembly 114, 116 move.

The hook assembly 114 is formed of a link 126 which carries a hook 118. For purposes of ease of discussion, only hook assembly 114 will be referred to herein with respect to the details of one or more examples of embodiments. However, the same discussion and features may apply equally to hook assembly 116 or any additional hook assembly not specifically illustrated herein. The hook 118 is formed of or includes a sharpened end 128 at one end of a shaft 130 which carries a translational member 132, such as a wheel or bearing assembly or slide. The hook 118 and shaft 130 may be integral and be formed of a rigid material, such as but not limited to stainless steel or plastic, but other materials suitable for the intended purpose may also be acceptable. For example, it is contemplated that the hook 118 may be formed of a rigid, but sufficiently strong plastic material. The hook 118 may be a hook or pin and may be configured to pierce or penetrate product carried by the conveyor belt 100 and may also or alternatively be configured to hold product down on the conveyor belt 100. For example, the hook 118 may have an approximate upward facing tip or sharpened end 128 or in the alternative may have an approximate horizontally facing tip or sharpened end 128. The shaft 130 in the illustrated example is generally flat, but may be formed of other geometric shapes. The hook 118 extends at an angle to the shaft 130 and an angle to the conveying surface 110 of the conveyor belt 100. In the illustrated embodiment, the hook 118 extends approximately perpendicular to the shaft 130 and to the conveying surface 110, and is in this position arranged to hold down product. Other shapes and arrangements of the hook 118 may be acceptable for the purposes provided.

A translational member 132 is provided for translating movement of the hook 118 between raised and lowered positions. As indicated, the translational member 132 may be a wheel, a bearing, a slide or any suitable mechanism accomplishing the same purposes. The translational member 132 in the Figures is a wheel or wheel assembly. The wheel assembly 132 is secured to the shaft 130 of the hook assembly 114 and may be secured by an axle 134 which extends through the shaft 130 and carries the wheels or bearings. As seen in the Figures, the wheel assembly 132 has a pair of wheels 136, with a first wheel positioned on a first side of the shaft 130 and a second wheel positioned on a second side of the shaft. The wheels 136 have a central aperture and are secured over the axle 134 by an attachment device 138, such as a nut. In the Figures, the axle 134 is a bolt having a head 140. A nut 138 is threaded on to the bolt at an end opposite the head. The wheels or bearings 136 are rotatable about the axle 134. Alternatively, the axle 134 may rotate within an aperture of the shaft 130.

The hook 118, and in particular the shaft 130, is slidable within the hook link 126. The hook assembly 114 is positioned such that the hook's sharpened end 128 is on the conveying side formed by the conveying surface 110 of the link 126 and the translational member 132 is on the inner surface 112 side of the link 126. As a result, the hook assembly 114 is retained within the hook link 126. The hook link 126 is formed of a rigid material, such as but not limited to stainless steel or plastic, but other materials suitable for the intended purpose may also be acceptable. For example, it is contemplated that the hook link 126 may be formed of a rigid, but sufficiently strong plastic material. The hook link 126 is sized to correspond with the modular belt links 102 and has a plurality of receptors 142 which are interleaved or aligned with receptors 108 or apertures that form passageways in adjacent belt links 102 or between the rows of links 106. A hinge pin 104 may be received the interleaved receptors 108 and 142, connecting the hook link 126 to the modular belt links 102 in the conveyor belt 100. The hook link 126 has a recessed aperture 144 and slot 146. The recessed aperture 144 forms a location for easy cleaning of the link 126 and hook assembly 114. The recessed aperture 144 has a recessed area 148, recessed below the conveying surface 110 and may assist in receiving the hook 118. The hook 118, and in particular the sharpened end 128, may be seated in the recessed area 148 below or in the same plane as the conveying surface 110 to avoid interference. The slot 146 is adjacent the aperture 144 positioned within the recessed area 148. The slot 146 is approximately perpendicular to the conveying surface 110 and extends through the link 126 from the conveying surface 110 to the inner surface 112. In one embodiment, the hook link 126 has a reinforcement segment 150 secured to the inner surface side of the link 126. The reinforcement segment 150 may be formed integral with the link 126 or may be a separate device attached by a suitable attachment mechanism or adhesive. The reinforcement segment 150 has a slot 152 which corresponds to and is aligned with the slot 146 in the link 126. The shaft 130 of the hook 118 is slidably received within the slot 146 and slot 152. To this end, the slot 146 in the link 126 and slot 152 in optional reinforcement segment 150 is shaped to correspond with the shape of the shaft 130 of the hook 118.

The shaft 130 is provided with a length which when in the raised position lifts the hook 118, and in particular the sharpened end 128, above the conveying surface 110 a distance sufficient to hook or engage a conveyed product, such as the belly of a meat product. The shaft 130 length is also sufficient to extend the wheel assembly 132 below the carryway and belt 100 and engage a track 122 below the belt 100.

Figure 7:
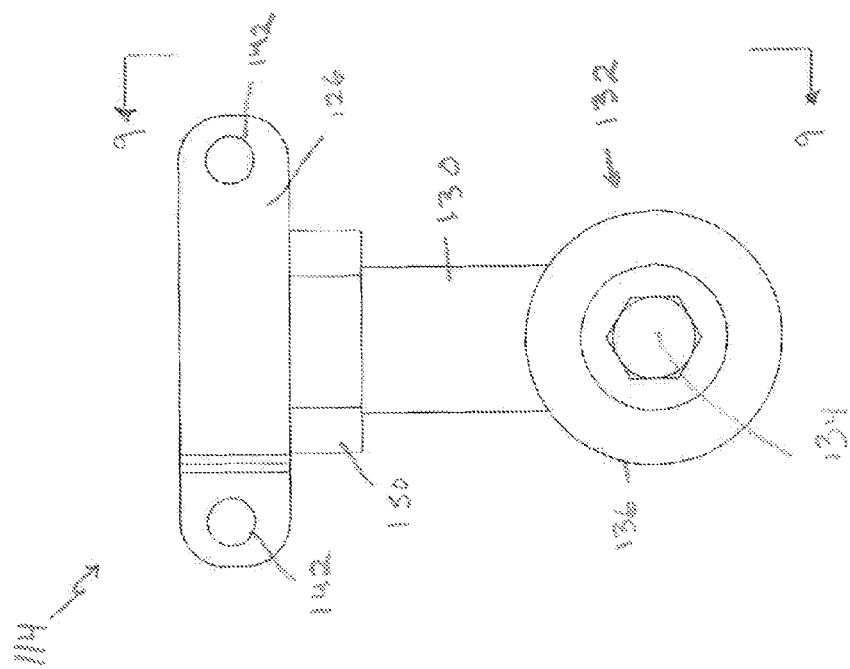
FIG. 7 is an side elevation view of a hook assembly having the hook assembly in the lowered position.
Figure 8:
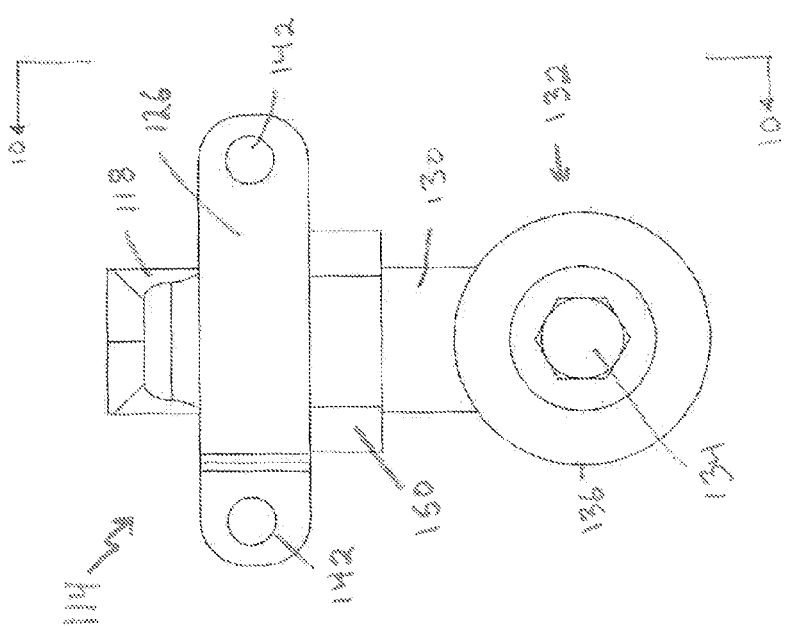
FIG. 8 is an side elevation view of the hook assembly shown in FIG. 7 having the hook assembly in a raised position.
Figure 10:
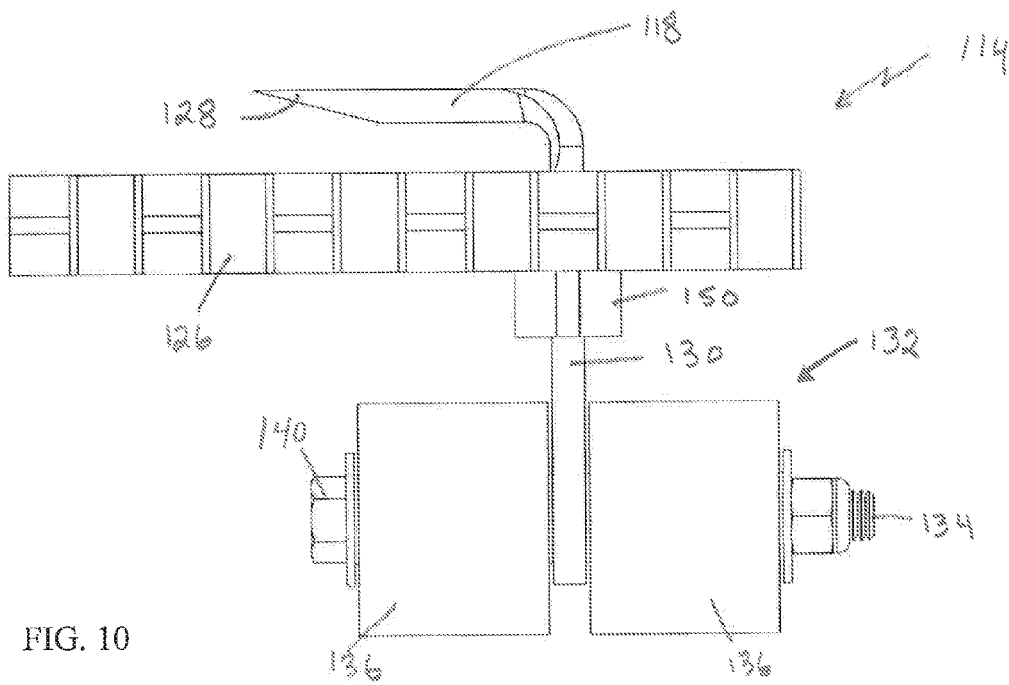
FIG. 10 is an end elevation view of the hook assembly shown in FIG. 7, taken from line 10-10 of FIG. 8.
Figure 9:
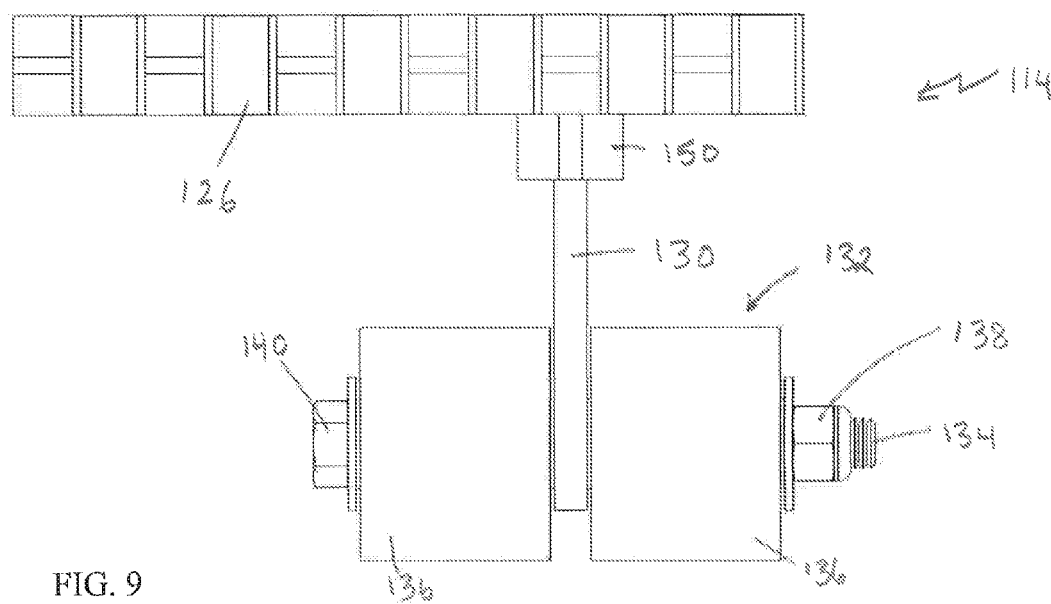
FIG. 9 is an end elevation view of the hook assembly shown in FIG. 7, taken from line 9-9 of FIG. 7.
Figure 11:
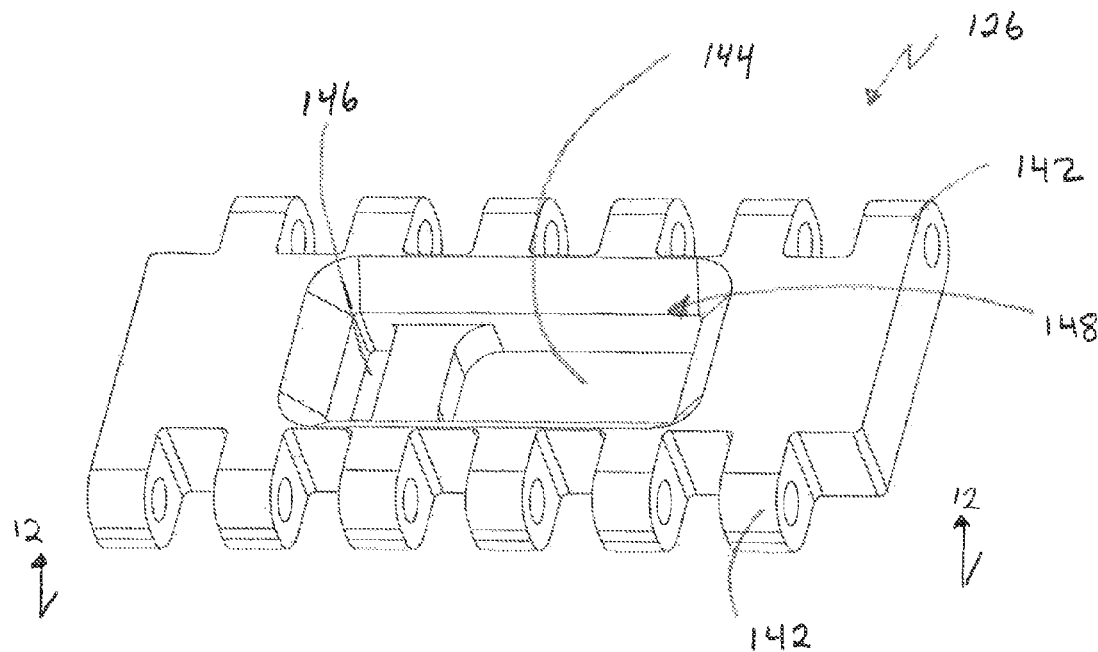
FIG. 11 is a top perspective view of a link for use with the hook assembly shown in FIG. 7.
Figure 12:
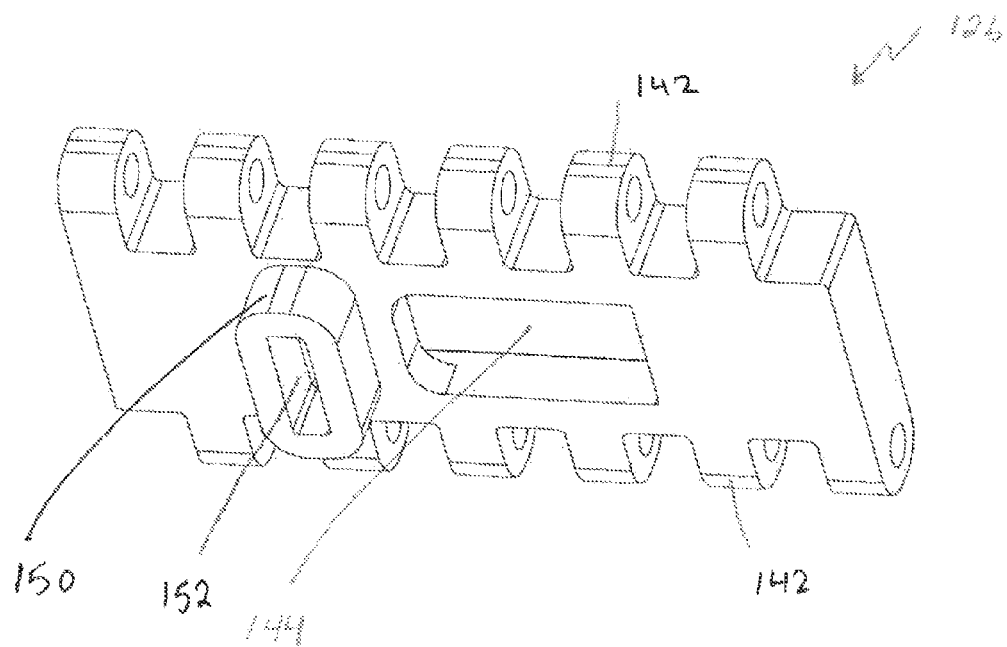
FIG. 12 is a bottom perspective view of a link for use with the hook assembly shown in FIG. 7, taken from line 12-12 of FIG. 11.
Figure 13:
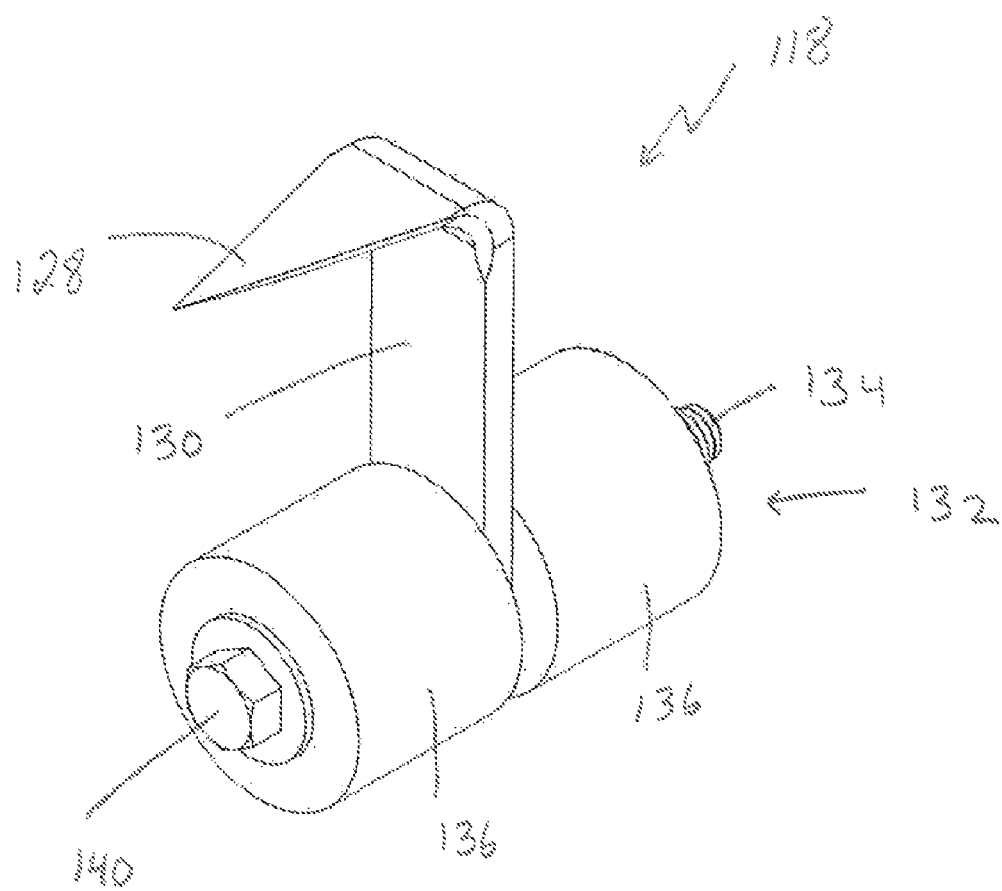
FIG. 13 is a perspective view of a hook for use with the hook assembly shown in FIG. 7.

In operation of the one or more examples of embodiments, a conveyor assembly 120 is provided. The conveyor assembly 120 has a carryway 124 which supports a modular conveyor belt 100 on the conveying side of the conveyor and on the return side of the conveyor may have one or more return rollers 154. One or more sprockets 121 are provided and engage the belt 100, transmitting motion to the belt 100 through a drive (not shown) or other suitable mechanism. The conveyor assembly has a track 122 seated below the carryway and/or belt 100. The track 122 may extend the length of the conveyor or may be positioned along a segment of the conveyor. In one or more examples, the track 122 is positioned along a segment of the conveyor. The hook assembly 114 is in its rest state, with the hook assembly 114 retained by the hook link 126 and seated based upon gravity. In other words, on the conveying side of the conveyor the hook assembly 116 is in a resting state in the lowered position (FIGS. 7 & 9). On the return side of the conveyor the resting state for the hook assembly 114 is in the raised position (FIGS. 8 & 10).

As the conveyor belt 100 moves, the attached hook assembly or assemblies 114, 116 move in unison with the belt 100. The hook assembly 114, 116 travels with the belt 100 in its rest position until it reaches the track 122. On the conveying side of the conveyor, in its rest position the hook assembly 114 is in its lowered position with the hook 118, and in particular the sharpened end 128, recessed within the hook link 126 (see hook assembly 116 in the Figures and FIG. 7). The translational member 132 or wheel assembly then engages the track 122 and moves or rolls along the track 122 following the track path. The track 122 has a ramp 156 or inclined portion and a straight portion 158 connected to the ramp. When the translational member 132 or wheel assembly engages the ramp 156, it moves along the ramp in the direction of movement of the belt 100. The translational member 132 or wheel assembly travels up the inclined surface of the ramp 156. While not shown in the Figures, it is noted that the ramp 156 may be or include a declined surface. As the assembly moves, the belt 100 and hook link 126 carrying the hook assembly 114 remain in the same travel path or plane. However, as a result of the travel of the wheel assembly 132 along the inclined surface of the ramp 156, the hook assembly 114, namely, the translational member 132 or wheel assembly and attached shaft 130 with hook 118, move in a vertical direction, moving the hook 118 above the conveying surface 110 of the belt 100. The inclined portion 156 of the track 122, at its top connects to a straight track segment 158. The translational member 132 or wheel assembly moves from the inclined segment 156 of the track 122 to the straight segment 158. When the wheel assembly 132 is positioned on the straight portion 158 or segment of the track 122, the hook assembly 114 is in its raised position (see FIG. 8), the hook 118 being positioned above the conveying surface 110. In this position, an operator can hook a product onto the hook 118. Optionally, the conveyor may have one or more additional track segments, such as an adjacent ramp and/or straight segment which moves the hook assembly to a lowered position thereby tightening the hold on the product attached to the hook 118. Once product is removed, the hook 118 can be lowered into the recess 148, and the hook assembly 114 into its lowered position, either by the absence of a track and allowing the hook assembly 114 to move into its rest state, or by a declined ramp and lower positioned track.

The hook assembly 114, 116 according to the foregoing provides a hook 118 or pin which is arranged to slide up and down within an interleaved link 126 of a plastic modular conveyor belt 100.

The hook assembly and modular belt described herein have various advantages over currently available devices. The hook assembly is easy to install, use, and maintain in a sanitary condition with a plastic modular conveyor belt. The hook assembly is more simple to use than currently available hook assemblies and is less expensive the current devices, as it is formed of a customized modular link that can be attached and carried directly by the plastic modular conveyor belt. Further, the hook assembly is easy to clean and maintain due to the use of an integrated modular link on a plastic modular conveyor belt and the openings and clearance provided by the components of the assembly. The hook assembly also provides the option to hold product, and in particular meat product, on a modular conveyor belt without an additional conveyor belt positioned over the top of the conveying surface.

Presently preferred embodiments of the invention and many of its improvements have been described with a degree of particularity. The previous description is of preferred examples for implementing the invention, and the scope of the invention should not necessarily be limited by this description. Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, angled, and so forth) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

What is claimed is:

1. A modular conveyor belt formed of a polymer-based material comprising:
   a plurality of plastic links interleaved and secured together by laterally disposed hinge pins, the plurality of plastic links forming a conveying surface;
   a hook assembly having a stainless steel link interleaved with a plastic link from the plurality of plastic links secured together by a hinge pin of said laterally disposed hinge pins to form a portion of the conveying surface, the stainless steel link having a recess in the conveying surface, an aperture disposed in the recess and a slot adjacent the aperture opening into the recess, the slot having a reinforced segment, a hook having a shaft slidable in the slot, a sharpened end of the hook disposed on a conveying side of the stainless steel link, and a translational member carried by the shaft and engagable with a track on a conveyor assembly such that the interaction between the track and the translational member results in movement of the hook between a lowered position in which the hook is positioned within the recess and a raised position in which the hook is disposed above the conveying surface.

2. The modular conveyor belt of claim 1, wherein the hook assembly is a hold down assembly.

3. A hook assembly for a modular conveyor belt having a conveying surface comprising a link coupleable with a plastic link from the modular conveyor belt by a hinge pin securing the link and plastic link together, the link having a recess in the conveying surface, an aperture disposed in the recess and a slot adjacent the aperture opening into the recess, the slot having a reinforced segment, a hook having a shaft slidable in the slot, a sharpened end of the hook disposed on a conveying side of the link, and a translational member carried by the shaft and engagable with a track on a conveyor assembly such that the interaction between the track and the translational member results in movement of the hook between a lowered position in which the hook is positioned within the recess and a raised position in which the hook is disposed above the conveying surface.

4. The hook assembly of claim 3, wherein the translational member is a wheel assembly.

5. The hook assembly of claim 3, wherein the translational member is a slide.

6. The book assembly of claim 3, wherein the link is a stainless steel link.

7. The hook assembly of claim 3, wherein the link is a plastic link.

* * * * *

UNITED STATES PATENT AND TRADEMARK OFFICE
CERTIFICATE OF CORRECTION

| | | |
|---|---|---|
| PATENT NO. | : 8,074,791 B1 | |
| APPLICATION NO. | : 12/854681 | |
| DATED | : December 13, 2011 | |
| INVENTOR(S) | : Jager | |

It is certified that error appears in the above-identified patent and that said Letters Patent is hereby corrected as shown below:

On the Title Page

Item (57), under "ABSTRACT", in Column 2, Line 8, delete "shall" and insert -- shaft --, therefor.

In the Specification

In Column 1, Line 19, delete "Meat" and insert -- meat --, therefor.

In Column 1, Line 59, delete "a'shaft" and insert -- a shaft --, therefor.

In Column 6, Line 6, delete "recess" and insert -- recessed area --, therefor.

In the Claims

In Column 8, Line 13, in Claim 6, delete "book" and insert -- hook --, therefor.

Signed and Sealed this
Eighth Day of October, 2013

Teresa Stanek Rea
*Deputy Director of the United States Patent and Trademark Office*